Jan. 7, 1969 N. J. COSTAS 3,420,675
DISPOSABLE COFFEE CARTRIDGE
Filed Oct. 26, 1964 Sheet 1 of 2
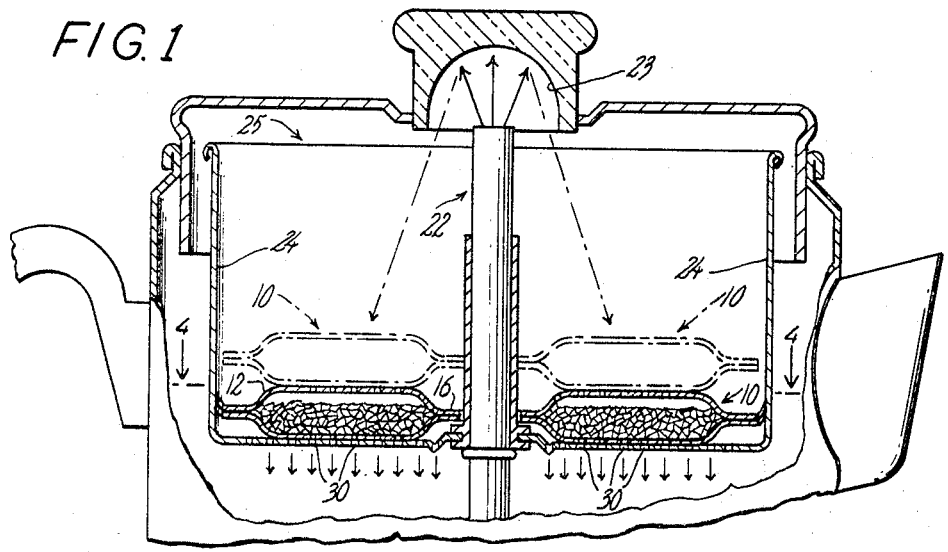
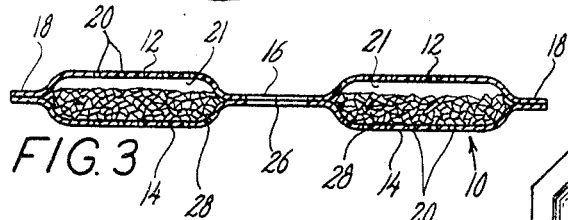
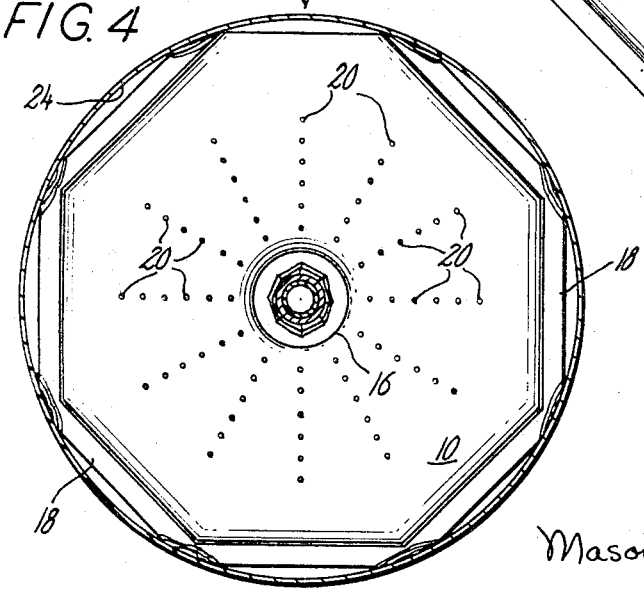
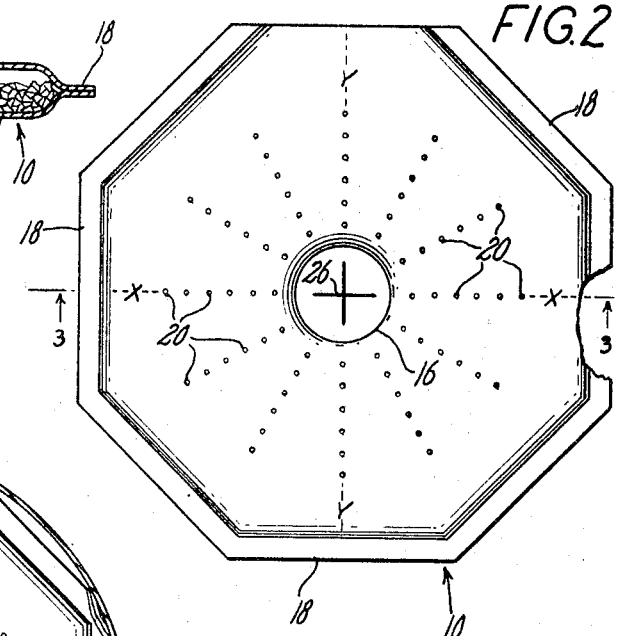
INVENTOR
NICHOLAS J. COSTAS
BY
Mason, Fenwick & Lawrence
ATTORNEYS INVENTOR
NICHOLAS J. COSTAS
BY Mason, Fenwick & Lawrence
ATTORNEYS

United States Patent Office 3,420,675
Patented Jan. 7, 1969

3,420,675
DISPOSABLE COFFEE CARTRIDGE
Nicholas J. Costas, 39 Collier Road,
Wethersfield, Conn. 06109
Filed Oct. 26, 1964, Ser. No. 406,491
U.S. Cl. 99—77.1          3 Claims
Int. Cl. A23f 1/08

ABSTRACT OF THE DISCLOSURE

A disposable paper coffee cartridge formed of upper and lower sheets sealed about their periphery and center to define an annular chamber containing coffee to be brewed with a plurality of radially extending perforations for allowing the passage of liquid.

---

In the past there have been numerous attempts to incorporate a disposable unit containing a predetermined quantity of coffee to be used as a substitute for filling the common coffee basket for the above stated purpose. For example, one arrangement disclosed showed a donut-shaped cartridge preferably of fabric, being used for brewing purposes. Another prior art cartridge similar in purpose to the above noted prior art bag differed therefrom in that a drawstring bag arrangement was used; and yet another device disclosed a fabric cartridge of particular spiral formation for brewing purposes and to facilitate removal thereof from the percolator basket.

Either because of cost or lack of brewing efficiency, there is no apparent evidence on the market to date that any of the above schemes have met with commercial success.

Accordingly, it is a prime object of this invention to provide a disposable cartridge superior to those of the prior art that is low in cost and permits maximum coffee flavor to be extracted during the brewing process.

It is an object of the present invention to provide an improved method of making percolated coffee which utilizes a premeasured disposable cartridge of coffee adapted to filter the coffee infusion and which is relatively economical and simple in operation.

It is also an object to provide a novel disposable cartridge containing a premeasured amount of coffee which is relatively economical and easy to manufacture and which is simple and highly effective in operation.

Another object of the present invention is the provision of a disposable coffee cartridge of "tasteless" paper having perforations radiating substantially outwardly and radially from and concentrated about the center thereof, so that the full flavor of the coffee can be extracted while the undesirable contaminates are captured by the paper.

Still another object of this invention is to provide a disposable coffee cartridge that may be heat-sealable and simple to fabricate.

A still further object is to provide a disposable cartridge that may be heat-sealed about its periphery and central portion and then formed at the central portion to provide a small relief whereby the cartridge can be snugly mounted about the riser of a percolator when placed in the basket.

Further aims, objects and advantages of this invention will appear from a consideration of the following description and the accompanying drawings showing for purely illustrative purposes embodiments of this invention. It is to be understood, however, that the description is not to be taken in a limiting sense, the scope of the invention being defined in the appended claims.

Referring to the drawings:

FIGURE 1 is a partial side elevation view with portions broken away of a percolator in which the coffee cartridge of the present invention is designed to operate;

FIGURE 2 is a top view of one embodiment of the disposable coffee cartridge of the present invention;

FIGURE 3 is a vertical section view of the coffee cartridge taken along lines 3—3 of FIGURE 2;

FIGURE 4 is a horizontal section view of the coffee cartridge taken along lines 4—4 of FIGURE 1 showing placement in the percolator basket;

Figure 5:
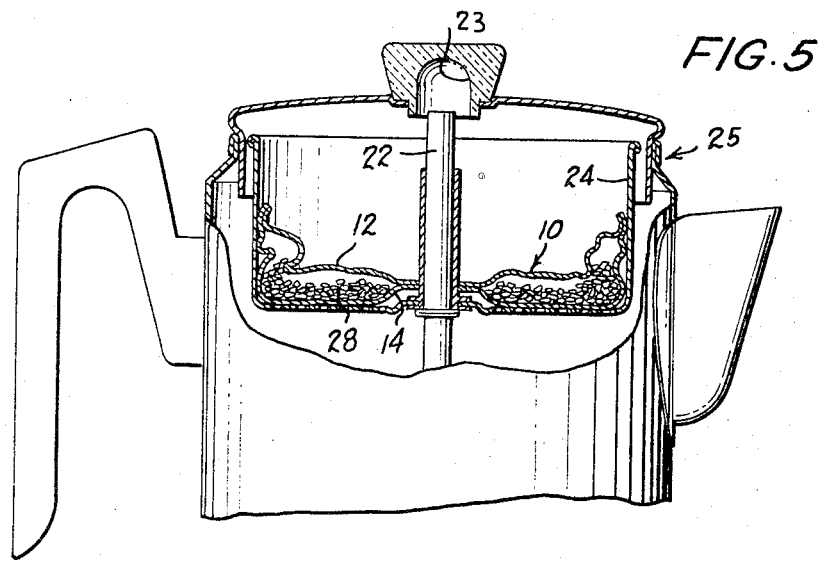
FIGURE 5 is a view similar to that of FIGURE 1 showing an oversize coffee cartridge positioned in the percolator.

Generally the invention comprises a disposable coffee cartridge which is formed from what is commercially known as "tasteless" paper into an envelope into which is measured a predetermined amount of coffee. More specifically, the envelope is formed of top and bottom sheet members which, in one embodiment, may have small perforations fanning out from their respective centers. The coffee is measured into the bottom sheet and the top sheet is then folded thereover. The sheets are then heat-sealed about their peripheries and at their centers. A relieved or apertured center portion is then cut at the sealed center to allow the cartridge to be snugly fitted over the percolator riser when placed into the basket. When the coffee is brewed, the cartridge may be easily removed and disposed of thereby eliminating the messy procedure that accompanies cleaning of the basket.

The pores of the paper making up the cartridge paper are, of course, smaller than the size of the coffee particles to retain the coffee in the cartridge. However, in one embodiment a combination paper comprising pores and somewhat larger perforations at predetermined locations is used to permit the perked water to soak through the entire cartridge so as to extract the water-soluble constituents and to flush out the water extract from the cartridge. Such a perforated cartridge ensures optimum operation in an extensive variety of coffee percolators without modifications.

The paper for the envelope has a heat-sealable surface to facilitate the forming operation. Preferably, the paper is a sheet comprised of a base portion containing long, substantially unhydrated fibers which are relatively inert and a top portion of thermoplastic fibers which are activatable by heat and pressure so as to permit bonding of the paper upon placement between heat-sealing jaws. Since there is a tendency for natural fibers to absorb some of the coffee oils, man-made fibers such as rayon, nylon and polyglycol terephthalate are most desirably employed as substantially the entire non-thermoplastic or inert fiber component of the base portion and bonded together by a small percentage of a highly beaten natural fiber or flock or other bonding agents such as the fibrids, and a water insoluble sodium carboxymethylcellulose.

Since the percolator baskets of the numerous manufacturers vary widely in diameter and generally from about 3 to 4½ inches in diameter, the cartridge of the present invention may normally be about 3 inches in width, and preferably may have a range of 3½ to 5½ inches, to cover the transverse wall of the common sized coffee basket and to provide marginal portions extending upwardly along the side wall of the basket to define a reservoir therebetween and prevent substantially any flow of water around the sides of the cartridge. Widths of greater than 6 inches provide no increased advantage and may present problems in disposition within the smaller diameter baskets. To enable the cartridge to conform relatively closely to the percolator basket, it preferably has a coffee chamber, and desirably also an envelope, which is of regular peripheral configuration and of at least six sides, preferably eight sides or more.

As a specific example of a heat-sealing paper which has proven highly effective is a web having a base sheet portion comprised of 95.0 percent by weight rayon (about 1.5–5.5 denier and 3/8 inch length) bonded by 5.0 percent by weight highly beaten manila hemp or caroa flock or by 5.0 to 10.0 percent by weight of the insoluble sodium carboxymethylcellulose, and having a top sheet portion composed of fibers of vinyl acetate-vinyl chloride copolymer of about 1/8 inch length and 3 denier. The weight ratio of base sheet portion to top sheet portion is about 60–80:30, and preferably about 70:30. The basis weight of the resultant sheet may vary from 8.5 to 14.5 pounds (480 sheets—24 inches x 36 inches). For wet strengthening, the web may utilize melamine-aldehyde, regenerated viscose or other substantially taste-free, nontoxic agents. The basis weight of the sheet may be varied dependent upon the desired strength of the sheet and the percentage of thermoplastic fibers may also be varied depending upon the strength desired for the seal between the top and bottom sheet portions.

It is generally accepted that quality percolated coffee is preferably made starting with fresh, cold water whether in an automatic percolator or in one heated over a flame. In an automatic, the cold water takes about two minutes to heat sufficient to commence the perking action; in a flame-heated pot a bit longer. The perking action should be timed for approximately seven minutes. During this time the molecules of air in the agitated water will evaporate during the perking and cartridge saturating process whereupon the optimum brewing results are realized.

If the brewing operation is started with hot or warmed water the molecules of air are absent from such water thereby rendering it flat and deprived of good brewing effects. It has also been found that a similar effect is experienced when an interposer or cover is used between the perking fluid and coffee or coffee cartidge. Such devices intercept and interrupt the fluid flow before it encounters the coffee or coffee cartridge resulting in a like flavor diminishing condition.

It is also well known that perked water is concentrated in the central vicinity of the percolator basket. In the light of such fact and through long and careful experiment it has been discovered by applicant that by the novel and simple expedient of providing small perforations in particular areas of a paper coffee cartridge a brew of coffee superior in taste and color quality can be extracted. Moreover, by virtue of the perforated paper cartridge of this invention and application of the perked water directly thereto an excellent brew of coffee can be obtained with a fraction of the coffee that need be used with known techniques of coffee brewing. That is, with current methods of brewing percolated coffee it is necessary to employ 1 ounce of a given brand of coffee to obtain two cups of acceptable brew. With the technique set out in this invention, 1/2 ounce of the same coffee brand will provide two cups of brew superior in color and flavor than that resulting by use of current methods.

Referring to the drawings wherein like reference characters designate corresponding parts throughout the several figures, the coffee cartridge is generally denoted by numeral 10. The cartridge 10 is formed by top and bottom sheet portions 12 and 14 respectively, having annular center portions 16. Peripheries 18 and center portions 16 are suitable for heat-sealing. Sheets 12 and 14 are pierced to establish perforations 20 that fan outwardly in predetermined arrays from center portions 16 and partially toward the peripheries 18. A predetermined amount of coffee is deposited in the lower sheet 14 before the top sheet 12 is emplaced, after which the top sheet is placed thereover. The peripheries 18 and centers 16 are then heat-sealed to form a circular coffee containing pocket 21.

The formed cartridge 10 is of a preferred octagonal shape and as stated above, preferably measures 3 or more inches across the diameters designated $x$ and $y$ in FIGURE 2. The center portions 16 measure about 3/4" in diameter and the perforations 20 about 1/64" in diameter. The latter dimension being satisfactory to retain "regular grind" coffee which is most suitable for use in percolators yet the perforations allow the perked water to rapidly flow across the top sheet 12 and impinge directly upon the entire contents of the cartridge 10 and then carry away the water-soluble portions of the cartridge. Obviously the perforations 20 are larger than the pores of the paper yet they must be small enough to retain the ground coffee within the cartridge. However, it should be noted that if a different "grind" was used th perforations could be larger or smaller as the situation demands.

Although it has been found that by adherence to the above set out dimensions a superior coffee brew results, it should be clearly understood that this invention is not limited to precise dimensions. As set out the above dimensions serve as preferred examples for the reasons to be noted below.

An outlet for a percolator riser or pump, indicated at 22, of percolators currently marketed are relatively small, about 1/16" in diameter. When the narrow stream of perking fluid is forced against a percolator crown 23 and then deflected toward the cartridge during a perking operation, the fluid is concentrated about a relatively small area, midway between peripheries 18 and central portions 16. As diagramatically illustrated by the arrows in FIGURE 1, the deflected fluid impinges directly on the cartridge midway betwen the riser 22 and the side wall 24 of the usual coffee basket 25 thereby allowing the fluid, when in an agitated state, to effect immediate but limited immersion of the coffee in the cartridge and extract the optimum of coffee flavor.

The center portions 16 of the cartridge 10 being relatively small in area so that the coffee in the envelope may be spread as close as possible to the riser 22. The centers 16 are slitted, shown by numeral 26, to snugly embrace the riser and prevent fluid leakage between the riser and centers 16.

The perforations 20 are of a diameter that is smaller than the width of the "regular grind" coffee particles, indicated at 28, for insuring their retention in the envelope. Moreover it has been found that in cartridges that are void of established perforations the coffee has a tendency to stick together as "lumps" thereby inhibiting a facile flow. Such conditions prevent optimum flavor extraction as a degree of coffee encapsulation ensues which results in partial brewing. When perforations are provided the agitated fluid can work through the coffee with less resistance and without undue delay. Consequently, the customary bath is avoided. The pocket space 21 is larger in volume than the measure of coffee therein to allow for expansion of the coffee during brewing. The brew flows through the openings 30 at the bottom portion of the basket and into the main reservoir of the percolator. The undesirable elements of coffee oils, tars and caffeine (which have predominant adhering qualities) are captured by the paper fibers thereby rendering the basket free from stain which is difficult to remove and, as is well known, act to detract flavor from succeeding coffee brews.

FIGURE 1 discloses a cartridge 10 in full lines and one shown in phantom. If it is desirable to brew 2 cups only a single cartridge containing 1/2 ounce of coffee is placed in the basket; for 4 cups, a second cartridge is employed which provides 1 ounce of coffee to be brewed; for 6 cups, a third cartridge, and so on.

Figure 6:
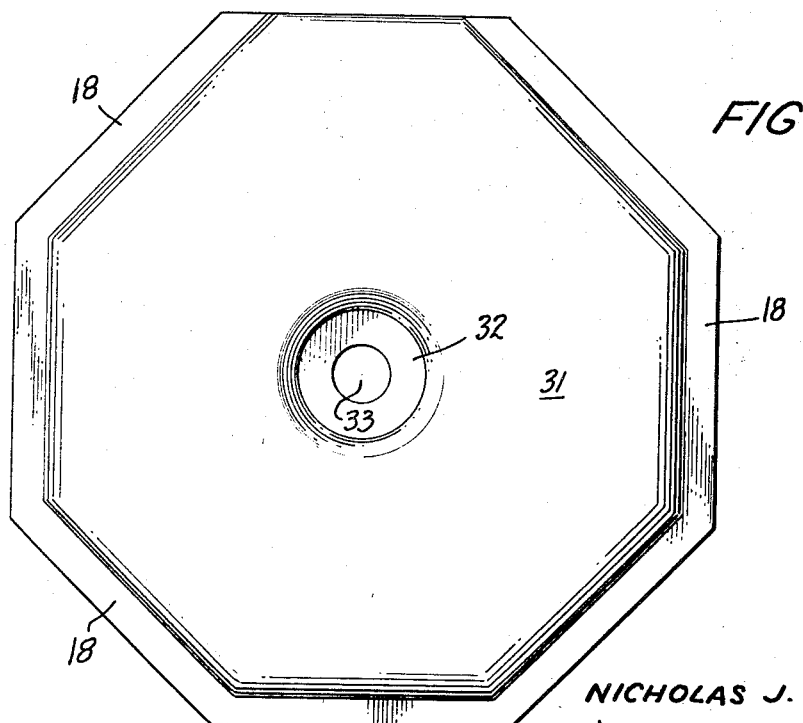
FIGURE 6 is a top view of a second embodiment of the disposable coffee cartridge.

In FIGURE 6 there is shown a modified coffee cartridge 31 in which the top and bottom sheets are not perforated as stated above for the preferred embodiment. In cartridge 31 the center 32 may be either slit as noted above or may be of circular configuration shown by numeral 33, through which the water riser 22 may project. The center opening 33 is preferably smaller than the riser 22 to effect a leak proof seal. In the embodiment of FIGURE 6, it is anticipated that the paper of the cartridge 31 would be substantially more porous than that used in cartridge 10. This more porous paper would allow a greater flow of water through the cartridge thereby extracting substantially an optimum amount of the water-soluble contents. However, it should be noted that a wide range of papers may be used in the cartridge 31 with good results being obtained.

As can be appreciated from inspection of the drawings, removal and disposal of the cartridge or cartridges after the brewing operation may be readily effected without the usual mess.

Having described the invention by making detailed reference to preferred forms of the elements thereof it is obvious that various modifications may be made without departing from the spirit of the invention. It is therefore understood that this invention is not limited to the exact arrangement disclosed except as limited by the state of the art to which this invention pertains.

I claim:

1. A disposable coffee cartridge for use in a percolator having a riser, coffee basket, cover and a fluid deflector fixed in the cover to effect coffee brewing, said cartridge comprising: a porous paper envelope having aligned top and bottom sheets connected together about their periphery by a first heat seal along their outer edges and connected together by a second heat seal at a central portion which encircles an area through which the riser can pass, a quantity of ground coffee located between said top and bottom sheets between said first and second heat seals, a plurality of perforations aligned to extend radially outward from said second heat seal in both the top and bottom sheets for allowing passage of liquid through the top sheet into contact with the coffee within the cartridge for subsequent passage through the lower sheet outwardly through the bottom of the coffee basket to the lower portion of the percolator.

2. The disposable coffee cartridge recited in claim 1 wherein said top and bottom sheet portions are connected along a portion of their periphery by a fold line along one edge of said cartridge.

3. The device of claim 1 wherein said second heat seal is provided with first and second intersecting slits through which said riser can pass.

References Cited
UNITED STATES PATENTS

| | | | |
|---|---|---|---|
| 1,454,739 | 5/1923 | Holland | 99—77.1 |
| 1,947,523 | 2/1934 | Hirschhorn | 99—77.1 |
| 2,187,417 | 1/1940 | Doble | 99—77.1 |
| 2,460,735 | 2/1949 | Carroll | 99—77.1 |
| 2,817,596 | 12/1957 | Schur | 99—77 X |
| 3,083,100 | 3/1963 | Baran | 99—77.1 |
| 3,183,096 | 5/1965 | Hiscock | 99—77.1 |
| 3,208,854 | 9/1965 | Hediger et al. | 99—77.1 |

RAYMOND N. JONES, *Primary Examiner.*